(12) United States Patent
Schatz

(10) Patent No.: US 6,234,027 B1
(45) Date of Patent: May 22, 2001

(54) PRESSURE SENSOR FOR SEMI-CONDUCTOR

(75) Inventor: Oliver Schatz, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,742

(22) PCT Filed: Nov. 3, 1997

(86) PCT No.: PCT/DE97/02541

§ 371 Date: Sep. 9, 1999

§ 102(e) Date: Sep. 9, 1999

(87) PCT Pub. No.: WO98/31998

PCT Pub. Date: Jul. 23, 1998

(30) Foreign Application Priority Data

Jan. 15, 1997 (DE) .............................. 197 01 055

(51) Int. Cl.$^7$ ...................................................... G01L 9/00
(52) U.S. Cl. ............................................................. 73/754
(58) Field of Search ........................... 73/754, 715, 708, 73/701, 719, 720, 721, 725, 726, 727; 338/3, 2, 4

(56) References Cited

U.S. PATENT DOCUMENTS 4,333,349  6/1982  Mallon .
4,622,856 * 11/1986 Binder et al. .......................... 73/727
4,682,503 * 7/1987 Higashi .................................. 73/755

FOREIGN PATENT DOCUMENTS

| 32 07 833 | 9/1983 | (DE) . |
| 0 083 496 | 7/1983 | (EP) . |
| 0 146 709 | 7/1985 | (EP) . |
| 0 436 920 | 7/1991 | (EP) . |
| 60-247129 | 12/1985 | (JP) . |

OTHER PUBLICATIONS

J. Dziuban et al. "Self–Compensating Piezoresistive Pressure Sensor." Sensors and Actuators A. vol. A42. No. 1/3. pp. 368–374 (Apr. 15, 1994).*

* cited by examiner

Primary Examiner—Max Noori
Assistant Examiner—Abdullahi Aw-Musse
(74) Attorney, Agent, or Firm—Kenyon & Kenyon

(57) ABSTRACT

A pressure sensor is based, in part, on the piezoresistive effect. In this, a pressure acting from outside effects a deformation of a resistor, arranged on a membrane, whose resistance changes as a result of that deformation. Since this resistor reacts with similar sensitivity to a deformation resulting from an internal mechanical interference stress, an arrangement is proposed which, with the aid of a compensation resistor, abolishes the effect of the internal mechanical interference stress. This arrangement serves, among other purposes, to compensate for temperature hystereses in integrated sensors, that hysteresis being caused principally by metallization planes in the pressure sensor and by temperature-related creep thereof.

11 Claims, 3 Drawing Sheets

PRESSURE SENSOR FOR SEMI-CONDUCTOR

FIELD OF THE INVENTION

The present invention relates to a semiconductor pressure sensor.

European Patent No 0 146 709 describes a pressure sensor. The pressure sensor is based on a (001) oriented silicon wafer which has been thinned down, in a small region which represents the sensitive zone, to a membrane a few micrometers thick. This membrane deforms as a result of pressure admitted on one side. This deformation is measured utilizing the piezoresistive effect. For this purpose, there are located on the membrane four measurement resistors whose electrical resistance changes as a result of the deformation. The four measurement resistors are connected to electrodes which are located on the unthinned part of the substrate. These electrodes make possible a measurement of the electrical resistance of the measurement resistor, and thus also of the pressure acting on the membrane.

Due to temperature-related flow of the electrode material, however, it is possible with pressure sensors of this kind for changes dependent on temperature history (so-called hysteresis effects) to occur in the characteristic curve of the component.

SUMMARY OF THE INVENTION

A pressure sensor according to the present invention has an advantage in that the aforementioned hysteresis effects are compensated for.

It is particularly advantageous to arrange on the membrane four measurement resistors which are interconnected as a Wheatstone bridge. This arrangement results in a particularly sensitive measurement of the electrical resistance or the change therein resulting from the externally applied pressure.

It is additionally advantageous to produce the electrodes from aluminum, since aluminum is particularly easy to process. Furthermore, it offers the advantage of generating, because of its low flow limit, an internal mechanical interference stress that can be used for hysteresis compensation.

It is advantageous to associate a compensation resistor with each measurement resistor, since the greatest possible accuracy is obtained in this fashion. The use of a semiconductor substrate and the production of resistors by way of doped zones in the semiconductor results in a particularly economical capability for applying resistors onto a membrane. In addition, conventional capabilities of micromechanics and microelectronics are then available for production of the pressure sensor with hysteresis compensation.

It is particularly advantageous to use silicon as the semiconductor, since this material allows the sensor element and electronic analysis system to be integrated on one chip.

Lastly, it is particularly advantageous to use the silicon substrate in a (100) orientation, since this surface, on the one hand, allows easy manufacture of the membrane by potassium hydroxide etching, and, on the other hand, has two [011] directions in the substrate surface, in which conductivity reacts particularly sensitively to deformation.

BRIEF DESCRIPTION OF THE DRAWINGS

FIGS. 3a–d show cross sections through a substrate with a metallic electrode on a surface according to the present invention.

DETAILED DESCRIPTION

Figure 1:
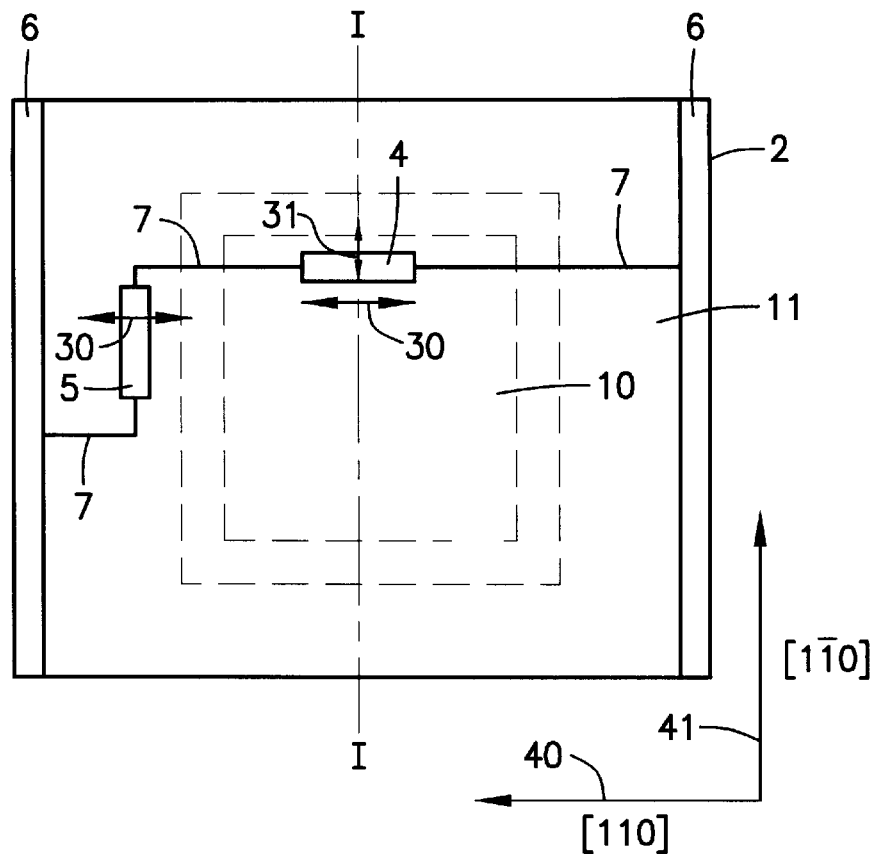
FIG. 1 shows a plan view of a first pressure sensor according to the present invention with hysteresis compensation.

FIG. 1 shows a plan view of a first simple pressure sensor according to the present invention. A sectioned drawing of this pressure sensor along section line A'A is depicted in one of the following Figures. The pressure sensor is manufactured on a substrate 2 made of silicon which has a (100) orientation. Located on the underside of the membrane, which is not visible in the depiction selected here, is a truncated pyramidal depression. Its shape is such that the tip of the pyramid faces toward the viewer, and that only a thin residual thickness (membrane 10) of silicon material remains at the location of the truncated tip of the pyramid. The boundary lines of the truncated pyramidal tip are drawn in FIG. 1 with dashed lines, and lie parallel to the [110] and [1$\bar{1}$0] directions, the orientation of which is marked in FIG. 1 with arrows 40 and 41. The unthinned portion of silicon substrate 2 will also be referred to hereinafter as support 11. Located on membrane 10, close to the membrane edge, is measurement resistor 4, which runs in the [110] direction. Located on support 11 are two electrodes 6 which are made, in the exemplary embodiment selected here, of vacuum-evaporated aluminum, such that one electrode is configured in front of and one electrode behind each measurement resistor 4, as an elongated metallization running perpendicular to measurement resistor 4. For the left-hand electrode, a compensation resistor 5 is located perpendicular to the direction of measurement resistor 4, running in the [1$\bar{1}$0] direction. Compensation resistor 5 is connected at one end to measurement resistor 4 via a connecting conductor 7, and at its other end to electrode 6 via a second connecting conductor 7. Double arrows 30 and 31 designate mechanical stresses which will be discussed when the manner of operation of the pressure sensor according to the present invention with hysteresis compensation is explained.

Figure 2:
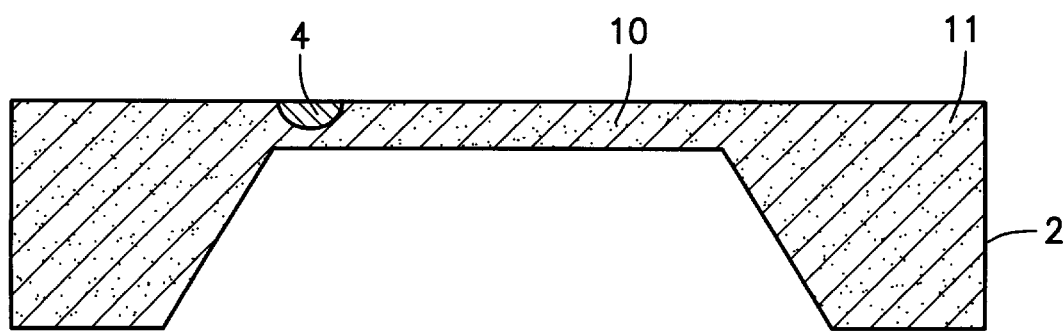
FIG. 2 shows a cross section through the first pressure sensor according to the present invention with hysteresis compensation.

FIG. 2 shows a cross section through the pressure sensor of FIG. 1, identical parts being labeled with identical reference characters. Substrate 2 has a depression, trapezoidal in cross section, which is delimited by support 11 and membrane 10. Measurement resistor 4 is located in the surface of membrane 10. Measurement resistor 4 is implemented by introducing a local doping zone into the silicon material.

The manner of operation of the pressure sensor according to the present invention with hysteresis compensation will now be explained with reference to FIG. 1.

The pressure sensor is mechanically elastically deformed by a pressure acting from outside on the pressure sensor. The thickness of support 11 is typically several hundred micrometers, whereas the thickness of membrane 10 is typically several micrometers. Because of the different rigidities resulting therefrom, the mechanical deformation in support 11 is negligible compared to the mechanical deformation in membrane 10. Mechanical deformation 31 resulting from the externally applied pressure is illustrated by an arrow whose length is an indication of the deformation. The mechanical deformation is depicted by way of example at one point, i.e., at the location of measurement resistor 4.

In addition, a first deformation 30 is present in the pressure sensor. The cause of first deformation 30 is a mechanical interference stress whose cause will be discussed in more detail in the next paragraph. A first deformation of this kind can be associated with each point in the pressure sensor, but only two points in the pressure sensor will be considered. These two points are assumed to be the location of measurement resistor 4, and the location of compensation resistor 5. In the exemplary embodiment selected here, first deformation 30 is assumed to be identical throughout, although this limitation is not mandatory and will be ignored in the description of FIG. 4.

Measurement resistor 4 and compensation resistor 5 are dimensioned so that their piezoresistive coefficients are of identical magnitude. The absolute values of the electrical resistance are also assumed to be identical given identical external conditions. The changes in the electrical resistance in measurement resistor 4 and in compensation resistor 5 resulting from first deformation 30 are thus of identical magnitude. But since the resistance is measured once in the direction of the deformation and once perpendicular to the deformation, the two resistance changes have different signs. The total change in the equivalent resistance for the series circuit made up of measurement resistor 4 and compensation resistor 5 as a result of first deformation 30 is thus zero. All that remains is therefore the change in the measurement resistance due to second deformation 31, to which compensation resistor 5, which is located on support 11, is not exposed.

The perpendicular orientation of compensation resistor 5 relative to measurement resistor 4 is not mandatory. For various reasons, however, it is particularly advantageous for a (100)-oriented silicon wafer. In an implementation of a corresponding circuit on different substrates or with different orientations, it is advantageous to ensure that the resistors exhibit characteristics that are of identical magnitude but of opposite sign, and that compensation resistor 5 is not acted upon by a second deformation 31 resulting from the external pressure that is to be measured.

Figure 3A:
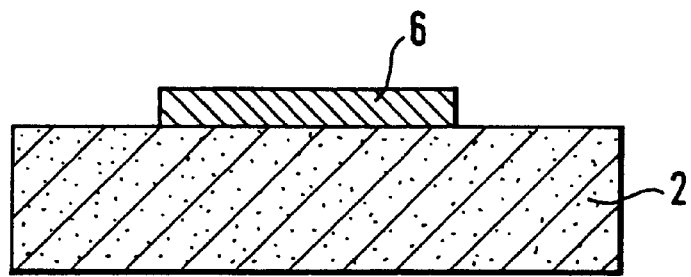
Figure 3B:
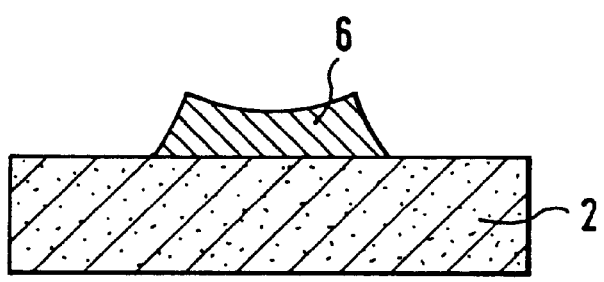
Figure 3B:
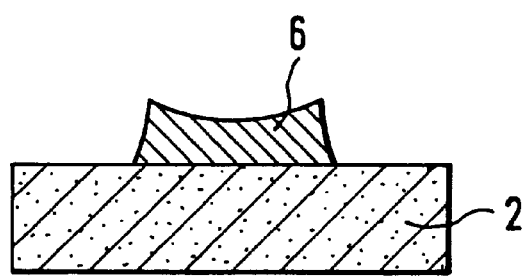

One possible reason for the occurrence of an interference stress will be illustrated by way of FIGS. 3a through 3d. FIG. 3a depicts a substrate 2 made of silicon, with an electrode 6 located thereon, in section. The expansion coefficient of aluminum is much greater than that of silicon. The effective expansion coefficient of a two-layer system made up of aluminum and silicon lies between those of the individual materials; in the exemplary embodiment selected here, the silicon layer is much thicker, so that the effective expansion coefficient of the two-layer system corresponds approximately to that of silicon.

Cooling causes both the substrate and the electrode to become shorter. Because of the much greater expansion coefficient of aluminum, electrode 6 shrinks slightly more on the side facing away from the substrate than on the side facing toward the substrate. In addition, a tensile stress is present in the electrode. This situation is apparent in FIG. 3b.

When the flow limit of aluminum is reached upon further cooling, electrode 6 becomes plastically deformable. With further cooling, the aluminum shrinks at the expansion coefficient of aluminum, while the substrate shrinks at the expansion coefficient of silicon. To compensate for the different shrinkages, the aluminum flows. These different expansion behaviors occur until, as a result of the flow, the internal stresses in the aluminum have built up to just below the flow stress.

Figure 3D:
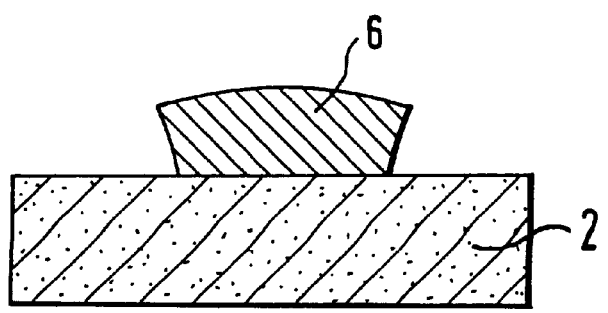

In response to a subsequent increase in the temperature, the aluminum expands together with the silicon; in the aluminum, first the tensile stress is dissipated, then upon further temperature increase a shear stress is built up before flow ultimately occurs again. At the same temperature as in FIG. 3b, the situation is as shown in FIG. 3d: the silicon has the same dimensions as in FIG. 3b, but the aluminum is now under shear stress rather than compressive stress, since greater contraction rather than expansion has occurred. These stresses are an example of the interference stresses described above. As is evident from a comparison of FIG. 3b with FIG. 3d, this interference stress state depends not only on the temperature—which is the same in FIGS. 3b and 3d—but also on the temperature history. This behavior makes the effect just described particularly useful, since it indicates hysteretic behavior.

Other sources of interference stresses, which do not all exhibit hysteretic behavior, are also contemplated by the present invention. For example, interference stresses can also occur if a multi-layer system is implemented using different materials with different expansion coefficients. These do not, however, involve hysteresis. An interference stress can also be induced if the pressure sensor is not mounted in stress-free fashion. This again does not involve hysteresis. The present invention effects compensation for interference stresses of every kind. Elastic interference stresses are, however, less significant in terms of the usability of the pressure sensors; it is rather the hysteretic behavior which impairs the usability of the pressure sensor.

The hysteretic interference stresses induced by metallization are approximately inversely proportional to the distance from the edge of the aluminum layer. In such a situation, the product of the resistance value and the distance of the resistor from the center of the interference stress must be approximately equal for the measurement resistor and the compensation resistor, so that the effect of the interference stress on the compensation resistor and the effect of the interference stress on the measurement resistor cancel one another out.

It is advantageous in this context to make the value of the compensation resistor as small as possible, and consequently to place it as close as possible to the electrode causing the hysteresis; this increases the measurability of the measurement resistor, since it constitutes a greater proportion of the equivalent resistance of the series circuit made up of the measurement resistor and compensation resistor.

Figure 4:
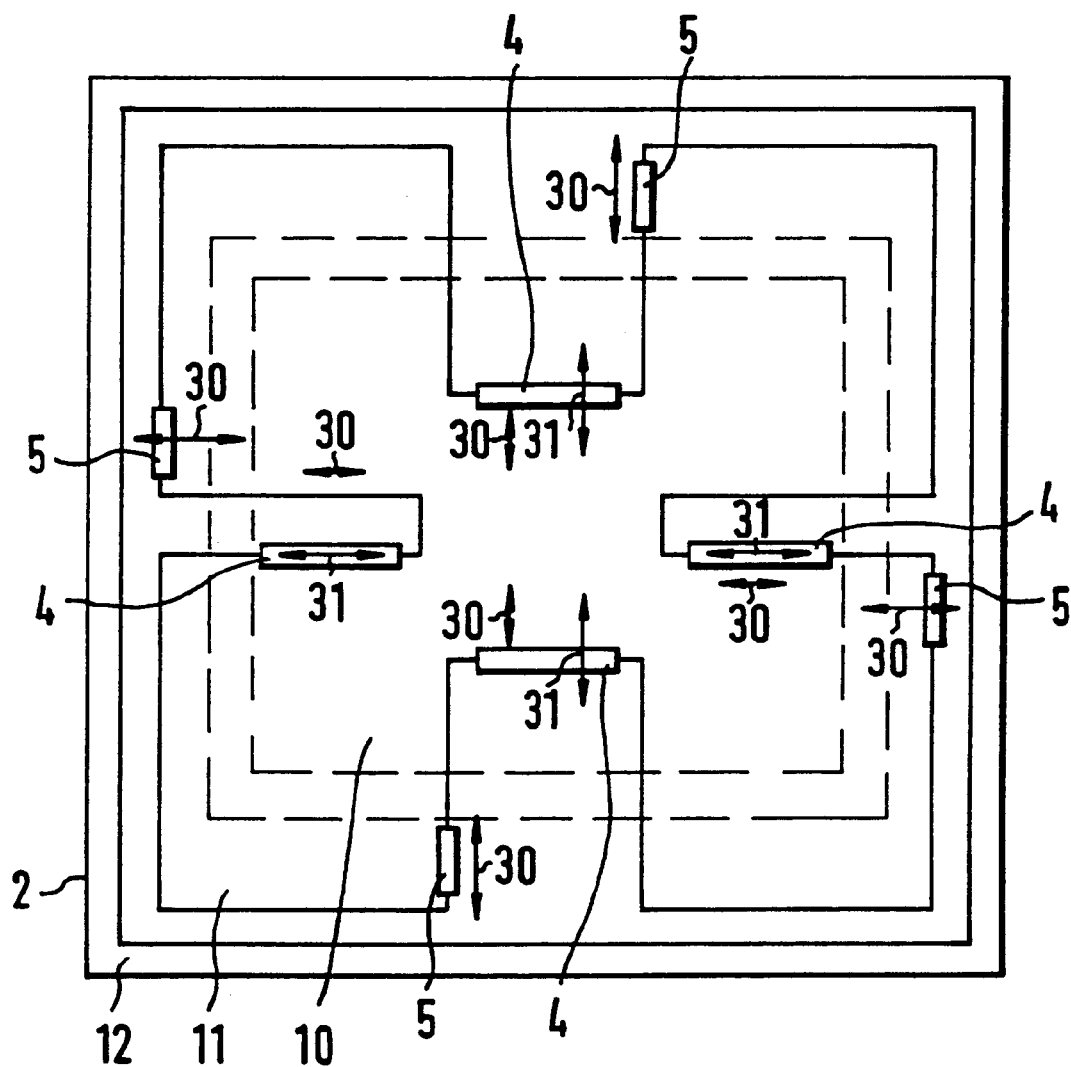
FIG. 4 shows a second pressure sensor according to the present invention with hysteresis compensation.

FIG. 4 shows a further exemplary embodiment according to the present invention of a pressure sensor with hysteresis compensation. Once again, the pressure sensor has a substrate 2 in which a membrane has been implemented in the manner illustrated FIG. 1. Located in the outer zone of support 11 is a region which has been schematically designated here as metallization 12. "Metallization" is, in this case, the collective term for electrodes 6 and all other metallization layers that are necessary for implementing an electronic analysis system. Four measurement resistors are applied on the membrane, all four resistors lying parallel to one another and in the vicinity of the centers of the lines delimiting the membrane. In addition, the pressure sensor has four compensation resistors 5 which are all parallel to one another and perpendicular to measurement resistors 4. Each compensation resistor 5 is associated with a different measurement resistor 4, and is located in its physical vicinity on the support segment that is not equipped with the metallization layer. Measurement resistors 4 and compensation resistors 5 are connected by way of connecting conductors 7 into a ring circuit in which compensation resistors and measurement resistors alternate, in such a way that adjacent resistors are always connected, and the connecting conductors are guided, to the greatest extent possible, on support 11 that is not covered with metallization 12.

Since, in this case, the compensation resistor is located closer than the measurement resistor to the element causing the hysteresis, and is consequently exposed to greater first mechanical deformations 30 than is the latter, the electrical resistance of the compensation resistor is correspondingly lower than the electrical resistance of the measurement resistor.

The resistors arranged in this fashion form a hysteresis-compensated Wheatstone bridge, the output signal being tapped off at corners located diagonally opposite one another. In this exemplary embodiment according to the present invention, each measurement resistor in the Wheatstone bridge experiences its individual hysteresis compensation.

What is claimed is:

1. A semiconductor pressure sensor for measuring an externally present pressure, comprising:

a semiconductor substrate including a region, the region being configured as a membrane, the membrane being deformable by the externally present pressure, the semiconductor substrate having an internal mechanical interference stress by which the entire semiconductor substrate is deformed;

at least one measurement resistor arranged on the membrane, the at least one measurement resistor having an electrical resistance, the electrical resistance of the at least one measurement resistor being modifiable as a result of a deformation of the at least one measurement resistor; and at least one compensation resistor arranged on the semiconductor substrate outside of the membrane, the at least one compensation resistor being coupled in series with the at least one measurement resistor, the at least one compensation resistor having an electrical resistance, the electrical resistance of the at least one compensation resistor being modifiable as a result of a deformation of the at least one compensation resistor, wherein a change in the electrical resistance of the at least one measurement resistor and a change in the electrical resistance of the at least one compensation resistor as a result of the internal mechanical interference stress are approximately identical in magnitude and different in sign.

2. The semiconductor pressure sensor according to claim 1, wherein the at least one measurement resistor includes four measurement resistors located on the membrane, the four measurement resistors being arranged in a Wheatstone measurement bridge.

3. The semiconductor pressure sensor according to claim 2, wherein one compensation resistor of the at least one compensation resistor is associated with a respective measurement resistor of the at least one measurement resistor only in one Wheatstone measurement bridge half.

4. The semiconductor pressure sensor according to claim 2, further comprising:

a Wheatstone bridge including a plurality of compensation resistors, wherein a bridge signal of the Wheatstone bridge acts upon a bridge signal of the Wheatstone measurement bridge.

5. The semiconductor pressure sensor according to claim 1, wherein at least one of the at least one compensation resistor is associated with each measurement resistor of the at least one measurement resistor.

6. The semiconductor pressure sensor according to claim 1, wherein the at least one measurement resistor is produced by local doping of the semiconductor substrate.

7. The semiconductor pressure sensor according to claim 1, wherein the semiconductor substrate is made of silicon.

8. The semiconductor pressure sensor according to claim 1, wherein the semiconductor substrate has a (100) surface, wherein the at least one measurement resistor extends in a {011} direction, and wherein the at least one compensation resistor associated with the at least one measurement resistor runs perpendicular to the at least one measurement resistor.

9. The semiconductor pressure sensor according to claim 1, wherein the membrane is non-circular.

10. The semiconductor pressure sensor according to claim 1, wherein the membrane is formed by removing a truncated pyramid from the semiconductor substrate.

11. The semiconductor pressure sensor according to claim 1, wherein the membrane is manufactured by potassium hydroxide etching.

* * * * *